United States Patent [19]

Otsuka et al.

[11] Patent Number: 4,674,078
[45] Date of Patent: Jun. 16, 1987

[54] OPTICAL INFORMATION REPRODUCING APPARATUS WITH IMPROVED SKEW ERROR CONTROL

[75] Inventors: Toru Otsuka; Tadashi Motoyama, both of Kanagawa, Japan

[73] Assignee: Sony Corporation, Tokyo, Japan

[21] Appl. No.: 685,128

[22] Filed: Dec. 21, 1984

[30] Foreign Application Priority Data

Dec. 29, 1983 [JP] Japan .............................. 58-247814

[51] Int. Cl.⁴ ............................................... G11B 7/00
[52] U.S. Cl. ............................................... 369/44
[58] Field of Search .................................... 369/43–46, 369/111, 124, 109, 110, 32, 33, 41; 250/201

[56] References Cited

U.S. PATENT DOCUMENTS

| | | | |
|---|---|---|---|
| 4,374,324 | 2/1983 | Van Rosmalen et al. | 369/45 X |
| 4,502,134 | 2/1985 | Kondo et al. | 369/46 |
| 4,589,103 | 5/1986 | Tajima | 369/46 |

Primary Examiner—Robert L. Richardson
Attorney, Agent, or Firm—Lewis H. Eslinger; Alvin Sinderbrand

[57] ABSTRACT

An optical information reproducing apparatus for reproducing an information recorded on a recording surface of a disc shape record medium is disclosed, which includes an optical pick-up device mounted on a tiltable optical block and having a laser beam source for generating a laser beam and a photo detector for detecting the refelected beam from the recording surface and for reproducing the recorded information, a device for rotating the record medium, a skew error detector for detecting a skew of the record medium relative to the optical pick-up device and for generating a skew error signal having a D.C. component and an A.C. component, a control circuit supplied with the skew error signal and for generating a control signal responsive to the D.C. component of the skew error signal, a skew error corrector controlled by the control signal and for controlling the optical block so that the optical axis of the pick-up device is maintained to be always perpendicular to the recording surface. The above control circuit includes a comparator for comparing the level of the skew error signal with a threshold level and for generating an output pulse, the width of which corresponds to the D.C. component of the skew error signal, and a pulse width discriminator for discriminating the width of the output pulse relative to a reference pulse corresponding to a rotating period of the record medium.

10 Claims, 35 Drawing Figures

FIG. 8
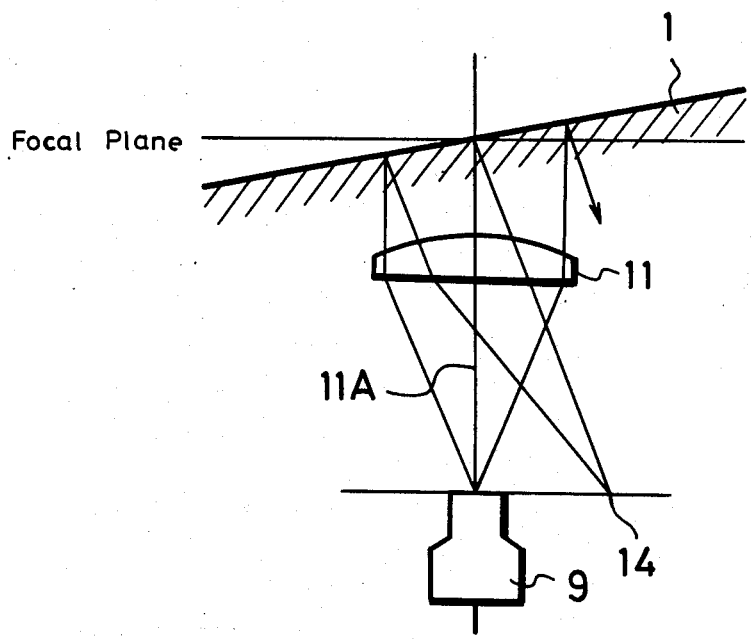
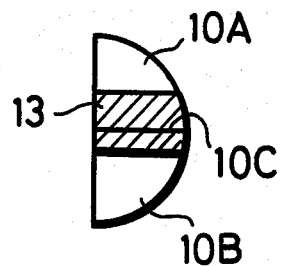
FIG. 9A
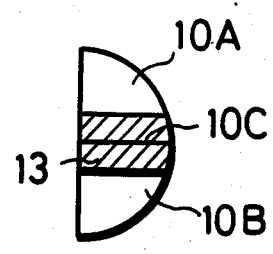
FIG. 9B
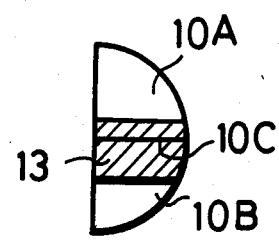
FIG. 9C

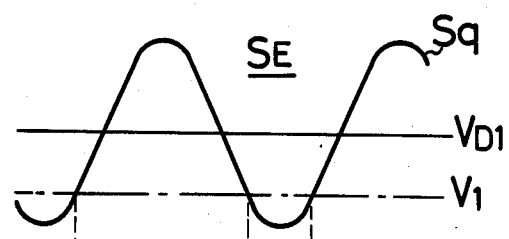
FIG. 16A
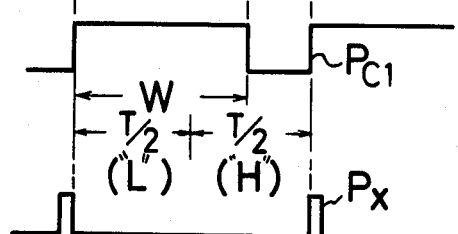
FIG. 16B
FIG. 16C
FIG. 16D
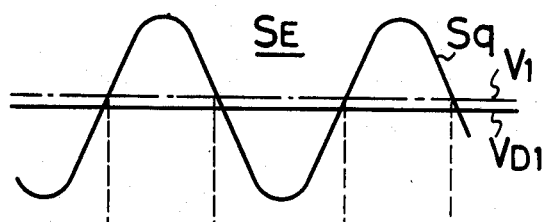
FIG. 17A
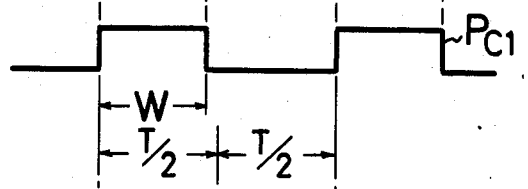
FIG. 17B
FIG. 17C
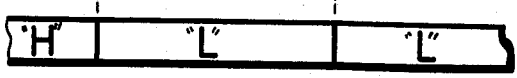
FIG. 17D

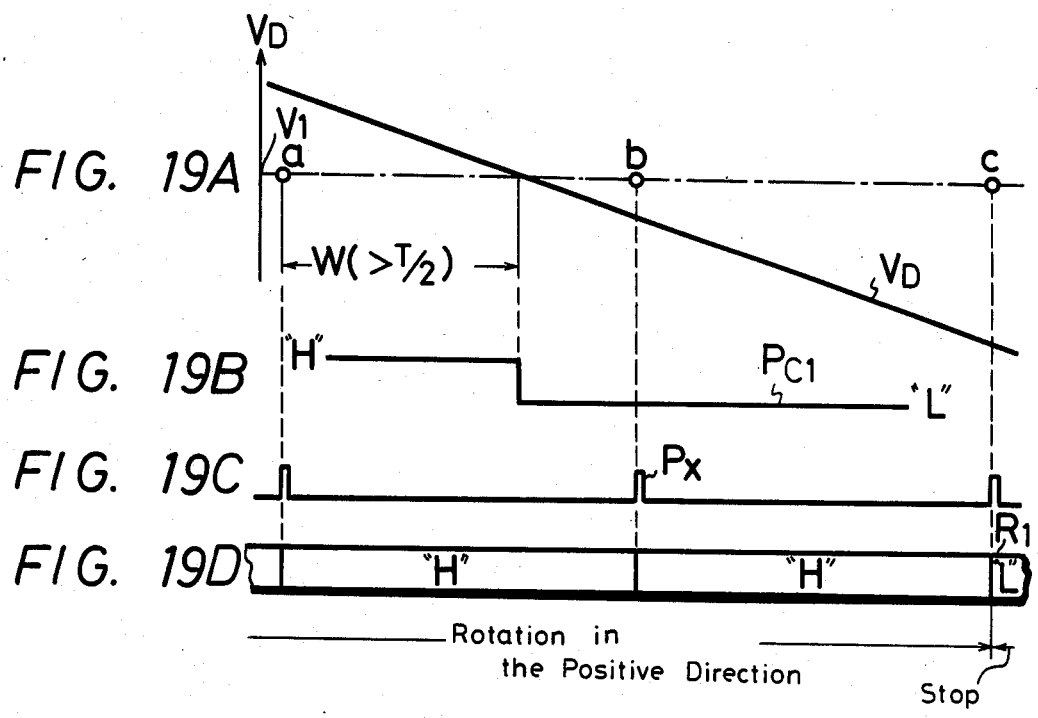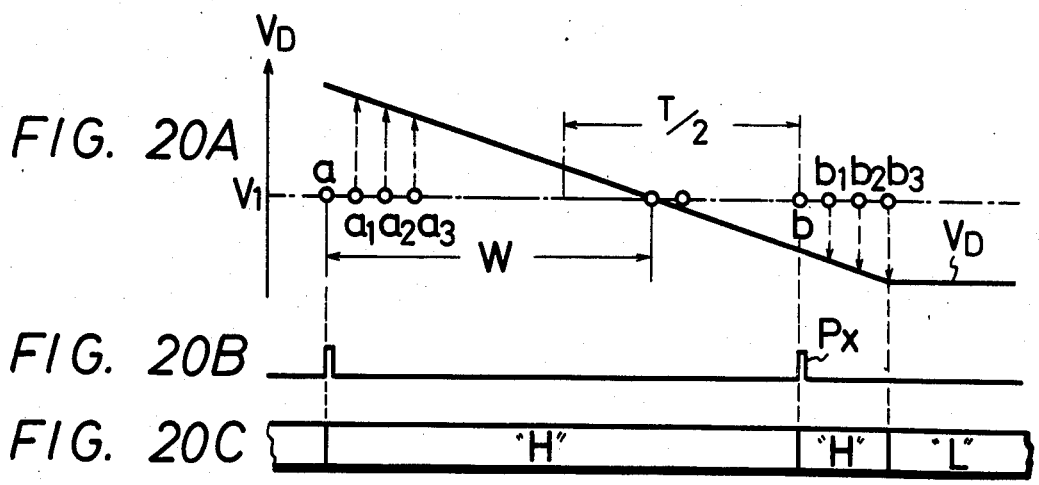

FIG. 21

| Sampling Timing | b | b₁ | b₂ | b₃ | b₄ |
|---|---|---|---|---|---|
| P_RG | / | H | H | H | H |
| P_C1 | / | L | L | L | L |
| P_EN | / | L | L | L | L |
| Up/Down- Operation of Counter 82 | / | D | D | D | D |
| Data Loaded to Counter 82 | 19 | 18 | 17 | 16 | 15 |
| R₁ | | H | H | H | L | L |
| Motor 26 | Rotation in the Positive Direction | | | Stop | |

OPTICAL INFORMATION REPRODUCING APPARATUS WITH IMPROVED SKEW ERROR CONTROL

BACKGROUND OF THE INVENTION

1. Field of the Invention

This invention relates generally to an optical information reproducing apparatus for reproducing an information recorded on a recording surface of a disc shape record medium such as an optical video disc and, in particular, to an optical information reproducing apparatus provided with a skew error detecting circuit for detecting a skew angle of a rotating disc such as an optical video disc and so on.

2. Description of the Prior Art

Generally in an optical disc reproducing apparatus, a laser beam is focussed on the recording surface of an optical disc by an objective lens so as to reproduce a signal recorded thereon. In this case, its resolution is determined by how much a laser beam is converged, or the diameter of beam spot so that the maximum value of the diameter of beam spot is selected to be less than a certain value. The diameter of beam spot is determined by the wavelength of a laser light from its source and the ratio between the focal length of an objective lens and its diameter (this ratio is generally presented as an NA (numerical aperture) value) and so on.

By the way, in the art a helium-neon laser is used as a light source. This helium-neon laser, however, causes the apparatus to become large in size and expensive. Accordingly, it is a recent trend that a semiconductor laser is used as the light source because it is inexpensive and suitable for making the apparatus compact in size.

However, the semiconductor laser is 780 nm in wavelength which is longer than 623.8 nm which is the wavelength of the helium-neon laser. For this reason, in order to establish a diameter of beam spot of the semiconductor laser which can provide the same resolution as that using the helium-neon laser as the light source, the NA value of objective lens must be increased to, for example, about 0.5 times.

However, if the NA value of the objective lens is increased as described above, when the optical axis of a laser beam is not vertical to the recording surface of a disc, crosstalk components from adjacent tracks on the disc become a serious problem.

As shown in FIG. 1A, when an optical axis 2 of a laser beam is perpendicular to the recording surface of a disc 1, a detected output D in its light receiving section becomes as shown in FIG. 1A in which crosstalk components from adjacent tracks $T_1$ and $T_2$ are small enough relative to the output from a main track $T_0$. However, as shown in FIG. 1B, when the optical axis 2 of the laser beam is not perpendicular to the recording surface of the disc 1 (this condition will hereinafter be referred to as the skew of the disc 1), the crosstalk components from the adjacent tracks $T_1$ and $T_2$, in this case, the crosstalk component from the track $T_1$ in the detected output D becomes large.

When the NA value becomes large, a crosstalk level Lc can not be neglected as will be clear from the relation expressed as $$Lc \alpha Wcm \frac{NA^3}{\lambda} \cdot \alpha$$

where Wcm is coma aberration, $\lambda$ the wavelength of the laser beam and $\alpha$ a skew angle of the disc in its radius direction. For example, under the condition that $\lambda$ is 780 nm, a track pitch is 1.67 $\mu$m and NA is 0.5, in order to establish the crosstalk level Lc = $-40$ dB, the condition of $\alpha \leq 0.5°$ has to be satisfied.

The skew of the disc at which the optical axis of the laser beam is not made perpendicular to the recording surface of the disc may be caused by the tilting or bending of a spindle shaft for rotating the disc, the tilting or bending of a turntable of the disc, the skew of the disc itself and so on. The main cause is considered as the skew of the disc itself, and at present a skew angle $\alpha$ of the disc itself in its radius direction is known as $1° \leq \alpha \leq 2°$. For this reason, when the semiconductor laser is used as the light source, it is necessary to detect the skew of the disc in the radius direction thereof (including skews other than the skew of the disc itself) and to cope with the increase of crosstalk components. The term of the skew will mean the same hereinafter.

An example of the skew error detecting means will be described next.

FIG. 2 schematically illustrates the example of such skew error detecting means, in which a skew error detecting means 5 is provided independently from a light source of an optical pick-up device. In FIG. 2 the skew error detecting means 5 is viewed in the direction along the radius direction of the disc 1, in FIG. 3 the detecting means 5 is viewed in the direction that is perpendicular to the radius direction of the disc 1 (FIGS. 2 and 3 respectively illustrate the detecting means 5 in cross-sectional way for convenience of explanation) and in FIG. 4 the detecting means 5 is viewed from the upper surface side of the disc 1 (the disc 1 is not shown).

A diffusion light source is used as the light source of the detecting means 5 and in the example as shown in FIGS. 2 to 5, a diode 9 is used as the light source, in which the light is diffused on the light-emission surface thereof.

The light, which is emitted from the light-emission diode 9 and reflected by the disc 1, is received by a photo detector 10 through a lens 11. This photo detector 10 is a two-divided photo detector that has two photo detecting regions.

The light-emission diode 9, the photo detector 10 and the lens 11 are each mounted on a housing member 12 that is formed of a cylindrical member. Specifically, as shown in FIG. 2, the lens 11 is mounted on the housing member 12 at one opening end thereof, while the light-emission diode 9 and the photo detector 10 are each mounted on the housing member 12 at the other opening end thereof at the position of the focussing surface of the lens 11 such that they are located at the left and right sides of the surface including the optical axis 1A of the lens 11.

The housing member 12 is placed such that, as shown in FIGS. 2 to 4 the lens 11 is located at the side of the disc 1, while the light-emission diode 9 and the two photo detector 10 are arranged in the direction perpendicular to the direction in which the skew error of the disc 1 is detected.

In the case of this example, since the skew of the disc 1 in its radius direction is detected, the light-emission diode 9 and the photo detector 10 are arranged in the direction perpendicular to the radius direction of the disc 1. In this case, the light-emission diode 9 and the photo detector 10 are located such that the optical axis 11A of the lens 11 becomes perpendicular to the recording surface of the disc 1 when the optical axis of the optical pick-up device 3 is perpendicular to the recording surface of the disc 1. Further, a dividing line 10C of the two-divided photo detector 10 is located along the direction perpendicular to the skew detecting direction, namely, in the direction perpendicular to the radius direction of the disc 1 and to intersect the plane that contains the optical axis 11A of the lens 11.

FIG. 5 is a perspective view illustrating the light-emission diode 9 and the two-divided photo detector 10.

With this arrangement, the real image of the surface portion of the light-emission diode 9 is focussed on the photo detector 10 as an image 13 as shown by a hatched area in FIG. 4.

When the optical axis 11A of the lens 11 is perpendicular to the recording surface of the disc 1, the optical path of the light incident on the recording surface of the disc 1 becomes perfectly symmetrical to that of the light reflected on the recording surface of the disc 1 as shown in FIG. 6. Accordingly, the real image of the light-emission diode 9 that is placed on the left-hand side of the plane including the optical axis 11A of the lens 11 and along the radius direction of the disc 1 is focussed on the focal plane of the lens 11 located at the right-hand side of the above plane. In FIG. 6, since the portion that is above the disc 1 is the portion which is reflected by the recording surface of the disc 1, if such portion is folded along the recording surface of the disc 1, such portion becomes as shown in FIG. 7. Thus, the real image of the surface portion of the light-emission diode 9 is focussed just at the position of the photo detector 10.

When the optical axis 11A of the lens 11 is perpendicular to the recording surface of the disc 1 as shown in FIG. 6, the image 13 is focussed over the divided regions 10A and 10B of the two-divided photo detector 10 simultaneously with the same amount as shown in FIG. 9B. Therefore, the photo-detected outputs from the respective divided regions 10A and 10B are equal to each other and the difference therebetween is zero.

When the optical axis 11A of the lens 11 is not perpendicular to the recording surface of the disc 1 due to the skew of the disc 1 as shown in FIG. 8, the position of the image of the light-emission diode 9 is displaced in the direction perpendicular to the radius direction of the disc 1 by the disc 1 that is tilted as shown by reference numeral 14 in FIG. 8. As a result, the image 13 of the photo detector 10 is focussed so as to be contained much in the side of the region 10B as shown in FIG. 9C.

When the disc 1 is tilted in the direction opposite to that shown in FIG. 8, namely, the disc 1 has a skew in which the left hand side of the disc 1 is tilted in FIG. 8, the image 13 of the photo detector 10 is focussed so as to be contained much in the side of the region 10A as shown in FIG. 9A.

As described above, by using the detected outputs of the optical image 13 from the respective regions 10A and 10B of the photo detector 10, it is possible to detect the direction and amount of the skew of the disc 1. This skew error signal is used as a servo signal for a movable section 40 that is as shown in FIG. 10.

FIG. 10 schematically illustrates an example of a movable section that includes the optical pick-up device and the skew detecting section.

In FIG. 10, reference numeral 20 generally designates an optical block which incorporates therein an optical system of the optical pick-up device for detecting a recorded information that is recorded as pits on the disc 1 and the optical system for detecting the skew of the disc 1. The focussing servo and tracking servo for the optical system of the optical pick-up device are formed by a two-axis optical driving section 21 similarly to the prior art.

Then, in the longitudinal direction of the recording track T relative to an optical axis 21A of the optical system of the optical pick-up device 3 (not shown in FIG. 10), the housing section 12 of the skew detecting means 5 is mounted on the optical block 20. Accordingly, the plane containing the optical axis 11A of the lens 11 is formed so as to contain the optical axis 21A of the optical pick-up device.

The optical block 20 is supported by a shaft 23 that is placed in the direction perpendicular to the radius direction of the disc 1 and is tiltable in the radius direction of the disc 1. That is, in this example, a worm gear 24 is mounted on the bottom surface of the optical block 20. The shaft 23 is rotatably inserted into shaft apertures 29A, 29B bored through two side plates 28A, 28B in such a manner that this worm gear 24 is meshed with a worm 27 that is rotated by a motor 26 of small size supported by a support base 25. Then, when the worm 27 is rotated by the motor 26, the worm gear 24 is rotated by a rotation angle corresponding to such rotation of the worm 27, whereby the optical block 20 is tilted in the radius direction of the disc 1. Thus, if the motor 26 is controlled by the skew error detected output of the disc 1, the optical axis 21A of the optical pick-up device can be controlled so as to be always perpendicular to the recording surface of the disc 1.

By the way, when the disc 1 has a skew error such that the disc 1 is tilted symmetrically to its rotation axis 0—0' as shown in FIG. 11, since such skew is constant in the rotation direction of the disc 1 so that as shown in FIG. 12, a skew error signal (D.C. component) SE is produced, which corresponds to a skew angle α of the radius direction of the disc 1. At this time, the skew servo is applied so as to make the skew error signal SE have a predetermined level V1.

On the other hand, when the skew angle of the disc 1 in the radius direction is not constant, a skew error signal SE is produced, in which the skew error component (A.C. component) in the rotation direction is superimposed on the average level (D.C. component) of the skew angle α in the radius direction produced when the disc 1 is rotated by one revolution. When the disc 1 is rotated at 1800 r.p.m., the frequency of the fundamental wave of the A.C. component becomes 30 Hz so that at this time, a skew error signal SE that is as, for example, shown in FIG. 13 is produced.

Therefore, in the skew servo system, the skew servo is applied such that the D.C. skew error component of the skew error signal SE becomes a predetermined level. Also, the skew servo is simultaneously operated so as to cancel out the A.C. skew error component. Since as the skew servo motor 26 that is provided in the movable section 40 there is generally used an inexpensive motor, if the skew servo system is constructed so as to respond to the A.C. skew error component that is contained in the skew error signal SE, the motor 26 is driven at all times. As a result, the life of the motor 26 becomes short, which is not so convenient in view of practical use.

Therefore, in the prior art, although the skew servo system is intended to be constructed in which the A.C. skew error component contained in the skew error signal SE is removed and only the D.C. skew error component is responded, since the skew error component includes the fundamental wave of 30 Hz, this A.C. component can not be cut by an ordinary low-pass filter completely. If this A.C. component is to be cut completely, the response time is made slow and the skew servo becomes excess servo.

OBJECTS AND SUMMARY OF THE INVENTION

Accordingly, it is an object of this invention to provide an optical information reproducing apparatus with an improved skew error detecting circuit.

Another object of this invention is to provide an optical information reproducing apparatus having such a skew error detecting circuit, in which a skew servo system can be prevented from being oscillated and a stable skew servo can be realized.

A further object of this invention is to provide an optical information reproducing apparatus with a skew error detecting circuit which can detect a skew error of a video disc that is rotated at a slow speed.

Yet a further object of this invention is to provide an optical information reproducing apparatus with a skew error detecting circuit which can realize the skew servo with high accuracy.

According to one aspect of this invention, there is provided an optical information reproducing apparatus for reproducing an information recorded on a recording surface of a disc shape record medium comprising:
- an optical pick up device mounted on tiltable optical block, and having a laser beam source for generating a laser beam and a photo detector for detecting a reflected beam from said recording surface and for reproducing the recorded information;
- means for rotating said record medium;
- a skew error detector for detecting a skew of the record medium relative to said optical pick up device and for generating a skew error signal having a D.C. component and an A.C. component;
- a control circuit supplied with the skew error signal and for generating a control signal responsive to the D.C. component of said skew error signal; and
- a skew error corrector controlled by the control signal and for controlling said optical block so that the optical axis of said pick up device is maintained to be perpendicular to the recording surface, wherein said control circuit includes a comparator for comparing the level of said skew error signal and a threshold level and for generating an output pulse, the width of which corresponds to the D.C. component of the skew error signal, and a pulse width discriminator for discriminating the width of said output pulse relative to a reference pulse corresponding to a rotating period of said record medium.

The other objects, features and advantages of the present invention will become apparent from the following description taken in conjunction with the accompanying drawings through which the like references designate the same elements and parts.

BRIEF DESCRIPTION OF THE DRAWINGS

FIGS. 6 to 9, 9A, 9B and 9C are respectively diagrams useful for explaining the operation thereof;

FIGS. 16A to 16D and FIGS. 17A to 17D are respectively waveform diagrams useful for explaining the operation thereof;

FIGS. 19A to 19D, FIGS. 20A to 20C and FIG. 21 are respectively diagrams useful for explaining the operation thereof.

DESCRIPTION OF THE PREFERRED EMBODIMENTS

Now, the present invention will hereinafter be described in detail with reference to FIGS. 14 to 17

When a semiconductor laser is used as the light source as mentioned above, if the skew angle is larger than 0.5°, a crosstalk is generated and hence information can not be picked up satisfactorily. However, if the skew angle $\alpha$ is less than 0.5° ($\alpha<0.5°$), without satisfying the condition, $\alpha=0$, it is possible to pick up the information having no crosstalk component. Further, when the skew error is generated in the rotating direction of the disc 1, such a skew servo operation that $\alpha=0$ is satisfied is made impossible.

Figure 14:
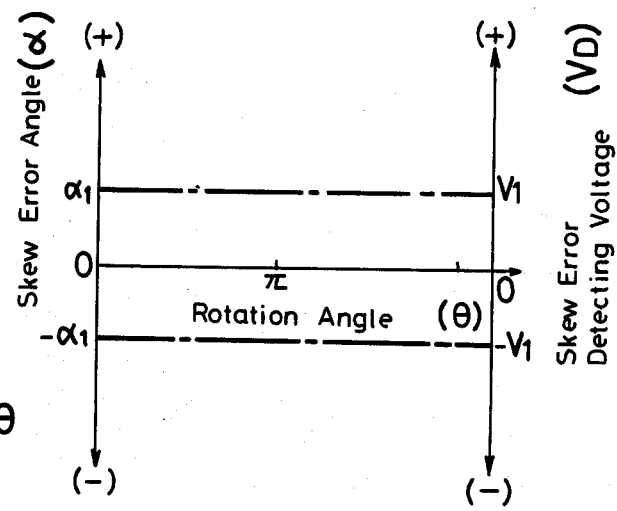
FIG. 14 is a diagram showing a relation between a skew error angle and a skew error detecting voltage.

Therefore, in this invention, as shown in FIG. 14, only when a skew error corresponding to a skew angle larger than skew angles $\pm\alpha$ (less than 0.5°, for example, around 0.4° in this embodiment) that can prevent a bad influence from being caused by the crosstalk, so as to carry out the skew servo, skew angles $\pm\alpha_1$ serving as threshold values are determined. If the skew error signal (D.C. skew error level VD) when the skew angle is $\alpha_1$ is taken as V1, when the skew angle is $-\alpha_1$, the D.C. skew error of $-V1$ is detected.

Figure 15:
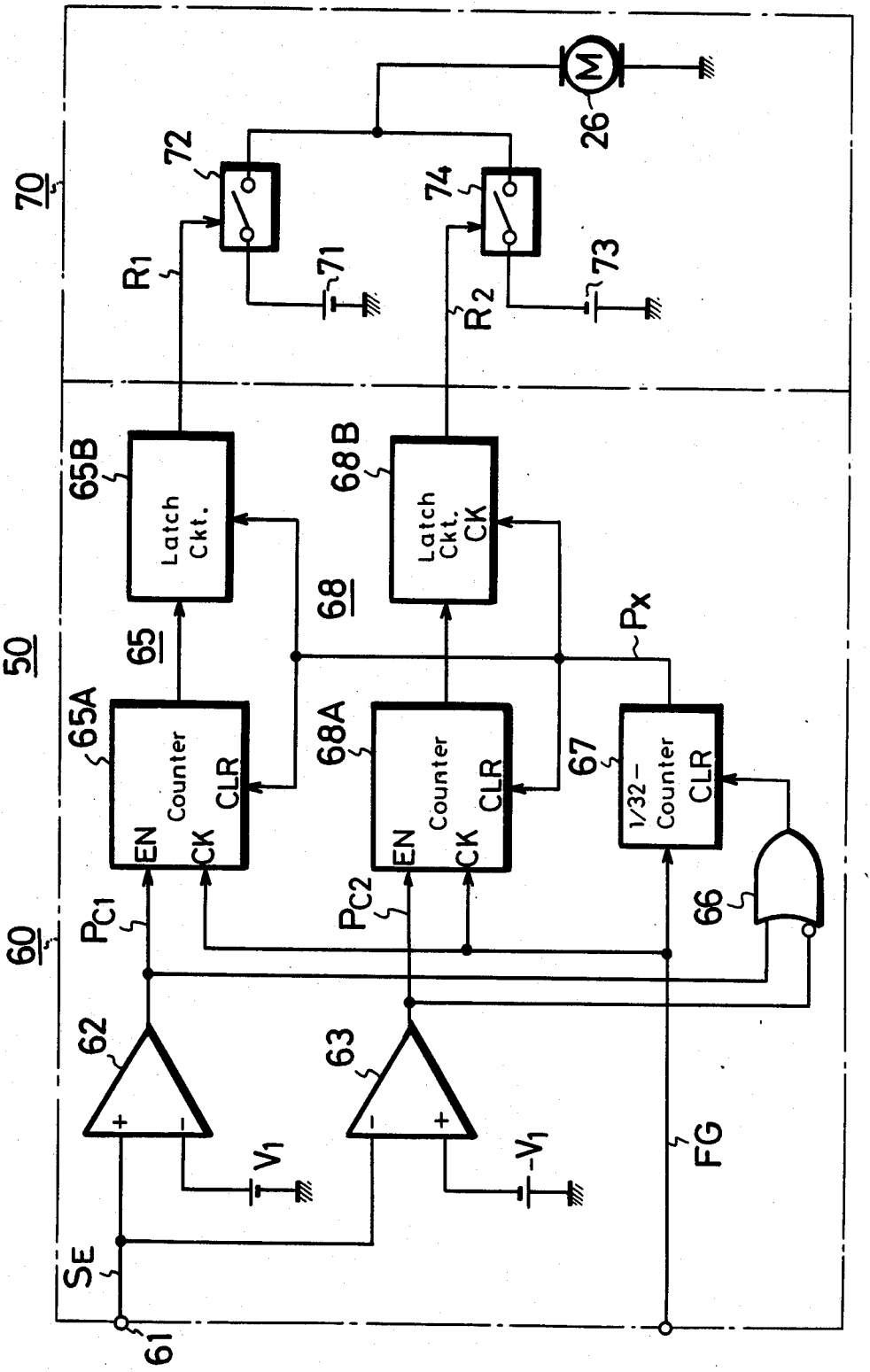
FIG. 15 is a systematic diagram of an example of a skew error detecting circuit according to the present invention.

FIG. 15 is a circuit diagram showing an example of a skew servo circuit 50 to which this invention is applied. In FIG. 15, reference numeral 60 generally designates a detecting circuit that detects the D.C. skew error corresponding to the skew angle $\alpha$ from the skew error signal SE. This circuit 60 is digitally formed as mentioned before. Reference numeral 70 generally designates a control system for the motor 26 that carries out the skew servo.

Figure 1A:
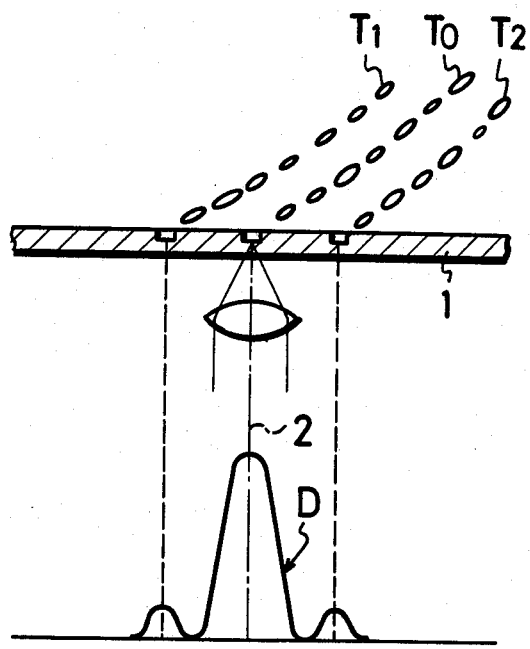
FIGS. 1A and 1B are respectively schematic diagrams useful for explaining a bad influence by the skew error of a video disc.
Figure 1B:
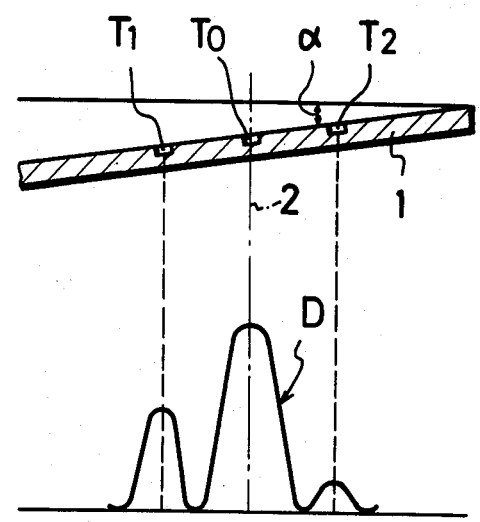
Figure 2:
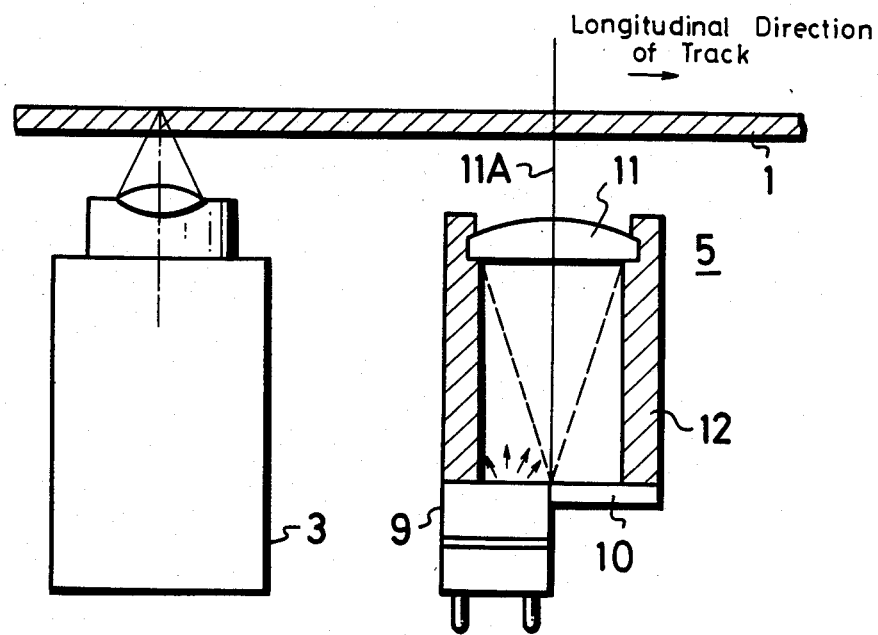
FIG. 2 is a diagram showing an example of a prior art skew detecting means.
Figure 3:
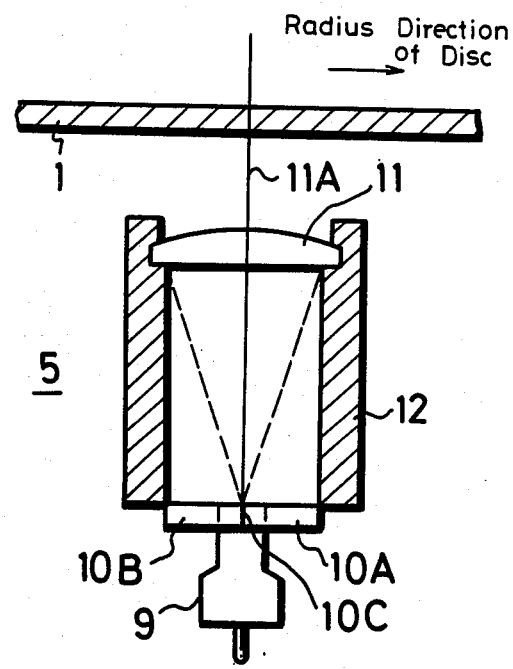
FIGS. 3 and 4 are respectively diagrams showing a construction of a main part of the example of the skew detecting means.
Figure 4:
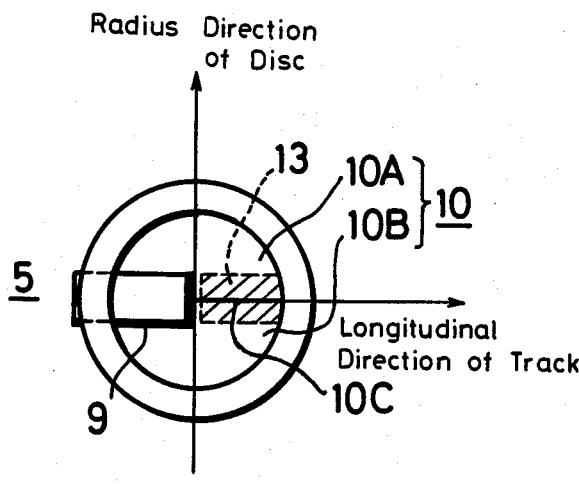
Figure 5:
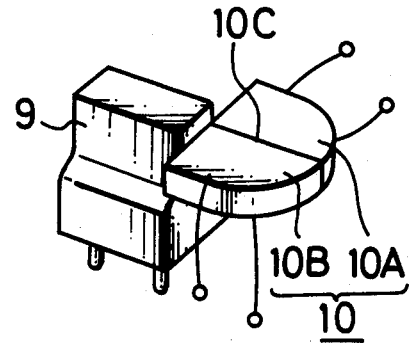
FIG. 5 is a perspective view illustrating the main part of the skew detecting means.
Figure 7:
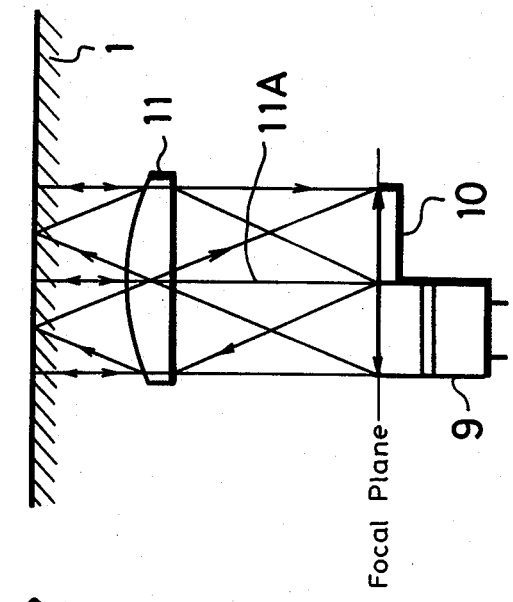
Figure 6:
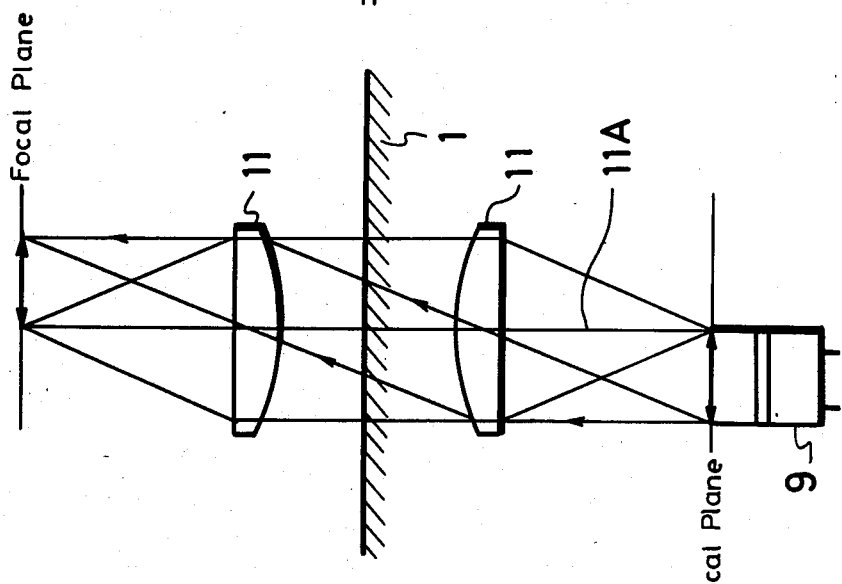
Figure 10:
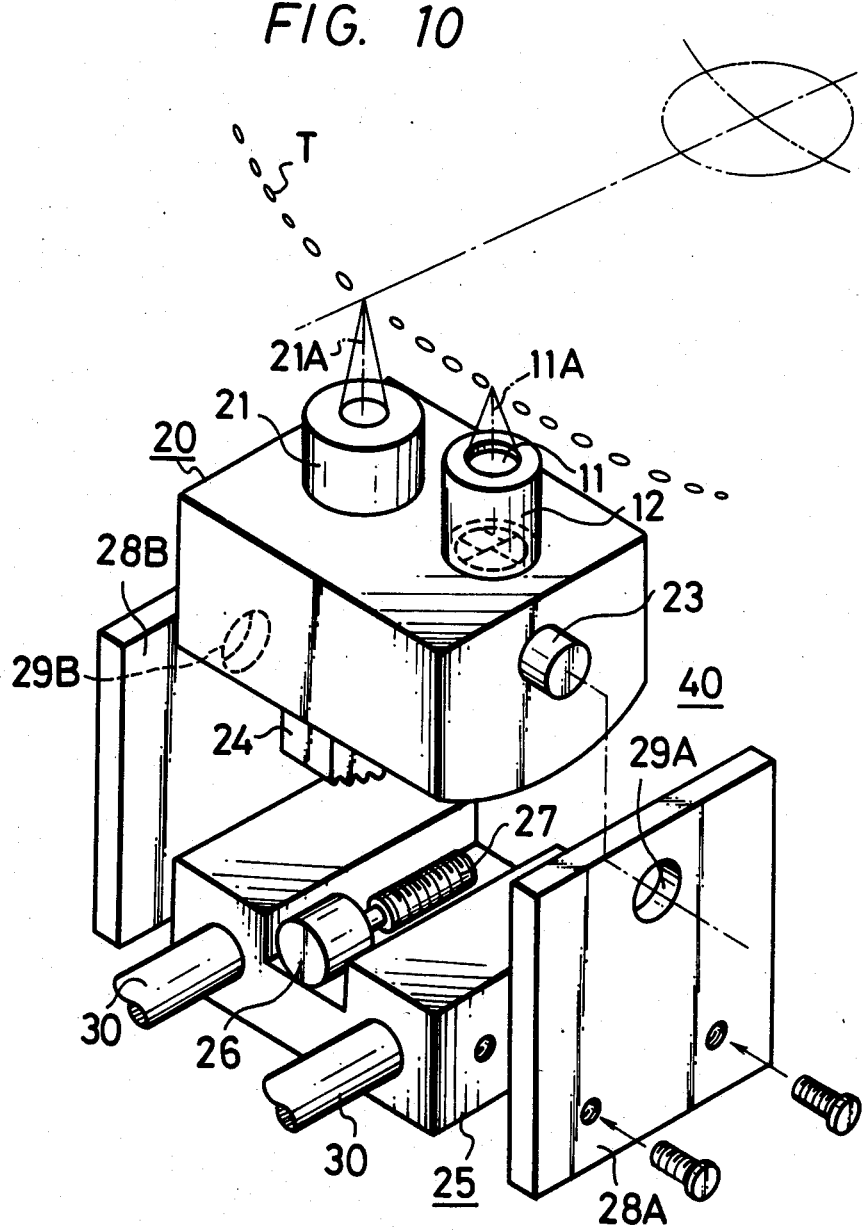
FIG. 10 is a perspective view illustrating an example of a mechanism which controls the optical axis of an optical pick-up device to always be perpendicular to the recording surface of a video disc.
Figure 11:
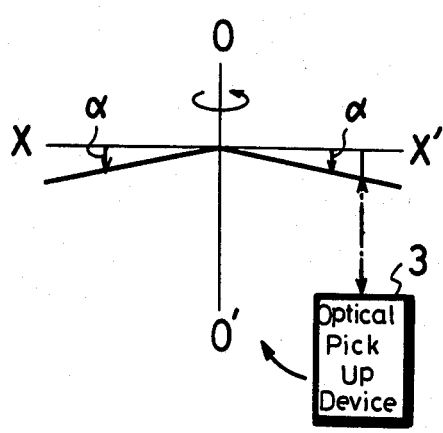
FIG. 11 is a diagram useful for explaining a skew of a video disc.
Figure 12:
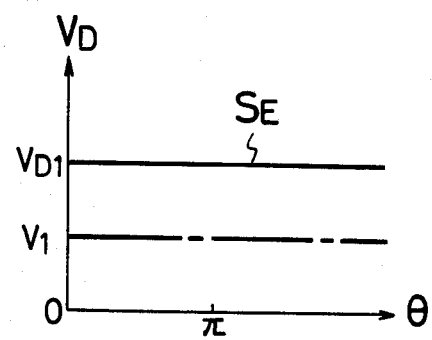
FIGS. 12 and 13 are respectively diagrams useful for explaining a skew error.
Figure 13:
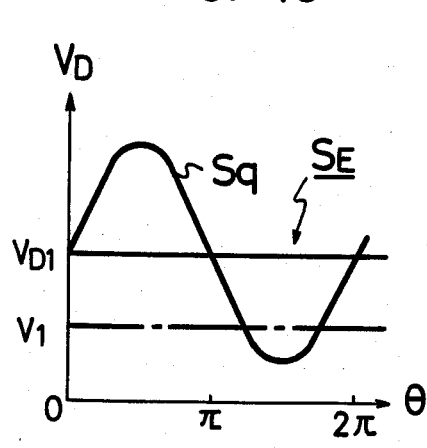

The skew error signal SE derived from the photo detector 10 is supplied through an input terminal 61 to a pair of voltage comparators 62 and 63. The first voltage comparator 62 is used to detect the skew error when the disc 1 is skewed below the reference surface X—X' of the rotating disc 1 as shown in FIG. 11. For this first voltage comparator 62, the threshold level V1 corresponding to the skew angle $a_1$ is set as the reference level. On the other hand, the second voltage comparator 63 is used to detect the skew error when the disc 1 is skewed above the reference surface X—X' of the rotating disc 1. Its threshold level is −V1. The following description will be given on the construction and the correction when $\alpha > 0$ is established.

Accordingly, as shown in FIG. 11, when the skew angle is $\alpha$ and the skew error is uniformly changed toward the rotation direction of the disc 1, in addition to the D.C. skew error VD1 (VD1>V1) as shown in FIG. 16A, the skew error signal SE having the AC skew error Sq as the fundamental wave of 30 Hz is applied to the input terminal 61. Therefore, the first voltage comparator 62 produces a first comparison output PC1 as shown in FIG. 16B. This comparison output PC1 is supplied to a first pulse width discriminating circuit 65 that is formed of a counter 65A and a latch circuit 65B.

The counter 65A uses as its clock a pulse FG that is produced from a frequency generator (FG) provided in relation to a disc drive motor (not shown). In this embodiment, 32 pulses FG are produced per one revolution of the disc 1. The first comparison output PC1 is supplied to the counter 65A as its enable pulse and the counter 65A is operated only during the period W in which the first comparison output PC1 is at high level.

Of the counted outputs, the MSB (most significant bit) data is latched in the latch circuit 65B. This latch operation is carried out at every one rotation of the disc 1 and the MSB data is latched in the latch circuit 65B at timing which will be described below. In this example, the first comparison output PC1 is supplied through an OR circuit 66 to a 1/32 counter 67, in which the pulse FG is counted at the rise-up timing of the first comparison output PC1 as a reference. As a result, a pulse Px (FIG. 16C) that is frequency-divided into 1/32 (that is in synchronism with the rotating cycle of the disc 1) is supplied from the 1/32 counter 67 to the latch circuit 65B. Therefore, the latch circuit 65B latches therein the MSB at the fall-down time of the first comparison output PC1. As shown in FIG. 16A, when the condition, VD1>V1 is established, W>T/2 is established (T is one cycle of the disc 1). Thus, since the MSB data at that time is "1", a latch output R1 becomes "H" (H represents the high level) as shown in FIG. 16D.

The latch output R1 from the latch circuit 65B is supplied to a power source switch 72 that is provided between a drive power source 71 and a motor M as its switching pulse. In this case, when the latch output R1 is at "H", the power source switch 72 is turned on whereby the motor 26 is driven by the power source 71 in the way of positive rotation.

So far as VD1>V1 is established, the MSB data from the counter 65A is "1". Then, during the period in which the latch output R1 is at "H", the driving of the motor 26 is continuously carried out so that by the positive rotation drive of the motor 26, the optical pick-up device 3 as shown in FIG. 11 is changed in the direction shown by an arrow and thus the angle at which the light from the light source in the optical pick-up device 3 is incident on the disc 1 is continuously changed.

When the optical axis of the light source in the optical pick-up device 3 is controlled so as to become perpendicular to the recording surface of the disc 1, the level of the D.C. skew error VD1 that is contained in the skew error signal SE decreases in accordance with such control. When VD1=V1 is established in principle, namely, when VD1 becomes a little smaller than V1 in practice, W<T/2 is established as shown in FIG. 17 so that the MSB data of the counter 65A changes from "1" to "0". As a result, the latch output R1 that is latched in the latch circuit 65B at every one rotation of the disc 1 becomes "L" so that the power source switch 72 is turned off.

Accordingly, at time point of the skew error detection at which VD1<V1 is established, the positive rotation of the motor 26 is stopped and the optical pick-up device 3 is stopped at such moved position. Further, since the skew error detection is carried out at all times during the period in which the disc 1 rotates, if VD1>V1 is again established, the above skew servo is of course carried out.

Depending on the disc 1 used, the disc 1 has the skew that is opposite to the above skew. The D.C. skew error −VD1 (not shown) at that time is detected by the second voltage comparator 63 and the second comparison output PC2 having the pulse width corresponding to the D.C. skew error −VD1 is supplied to a counter 68A that constructs a discriminating circuit 68 and which then produces the counter output that corresponds to the pulse width of the second comparison output PC2.

Of the counted outputs, the MSB data is latched in a latch circuit 68B similarly so that the second comparison output PC2 is also supplied through the OR circuit 66 to the counter 67 which then produces the pulse Px similar to that shown in FIG. 16C, which then is fed to the latch circuit 68B.

The MSB data of the counter 68A becomes "1" when −VD1<−V1 is established and at this time, a latch output R2 becomes "H". A power source switch 74 inserted between a reverse rotation power source 73 and the motor 26 is turned on by this latch output R2 to allow the reverse rotation drive power source 73 to be connected to the motor 26, thus the optical pick-up device 3 being moved in the direction opposite to the direction shown in FIG. 11. Therefore, the light incident angle of the light source in the optical pick-up device 3 relative to the disc 1 is changed so as to decrease the D.C. skew error. Then, at time point of skew error detecting time point at which −VD1>−V1 is established, the reverse rotation of the motor 26 is stopped and hence the optical pick-up device 3 is stopped at the moved position.

As is clear from the above explanation given on the operation, the discriminating circuits 65 and 68 each have the function to discriminate the magnitude between the first and second comparison outputs PC1 and PC2 with the pulse width corresponding to the DC skew error VD1 and −VD1 and the pulse width T/2 that is in relation to the rotation cycle of the disc 1.

When the discriminating circuits 65 and 68 and the first and second voltage comparators 62 and 63 are combined with one another, it is possible to form the circuit system that is not responsive to the AC skew error Sq contained in the skew error signal SE but is responsive only to the DC skew error. Accordingly, this skew error detecting circuit 60 functions as a low-pass filter that filters the rotation frequency component of the disc 1.

Of the skew errors, although the AC skew error signal Sq has various AC components depending on the state of the skew in the disc rotation direction, all of these AC components are higher harmonic components of 30 Hz. As a result, even the AC skew error having such higher harmonic components can be filtered positively by the above circuit and it is possible to positively detect the DC skew error that is the average value of the skew errors in the disc rotation direction.

A described above, according to this invention, since the AC skew error component that is contained in the skew error signal is removed and the skew error detecting circuit is made responsive to only the D.C. skew error component, even if there exist both the D.C. and A.C. skew errors, it is possible to carry out the skew error correction with accuracy. Further, since the skew error detecting circuit removes the A.C. skew error component and has a dead zone to the skew error that is within the threshold levels ±V1, the motor 26 can be protected from being applied with the overload and even the inexpensive motor 26 can be considerably increased in life span.

Furthermore, according to this invention, since the low-pass filter is constructed digitally, it is possible to prevent the response characteristic from being deteriorated unlike the prior art case in which the low-pass filter is formed of a resistor and a capacitor. As a result, it is possible to improve the response characteristic of the skew servo system.

While the above embodiment is effective for the case that the rotation speed of the disc 1 is high, if this circuit is applied to the case where the rotation speed of the disc 1 is low, the duration or interval of the latch timing becomes longer. As a result, there is then a fear that the DC skew error VD at the latch timing will exceed the other reference level −V1. In some case, the skew servo circuit is caused to oscillate. Particularly when the absolute value of a pair of reference levels, V1 and −V1 is made small in order to raise the accuracy of the skew servo system, the possibility of such oscillation increases.

Subsequently, an embodiment of a skew error detecting circuit according to this invention that can remove the above fear will be described in detail with reference to FIG. 18 and the followings.

Figure 18:
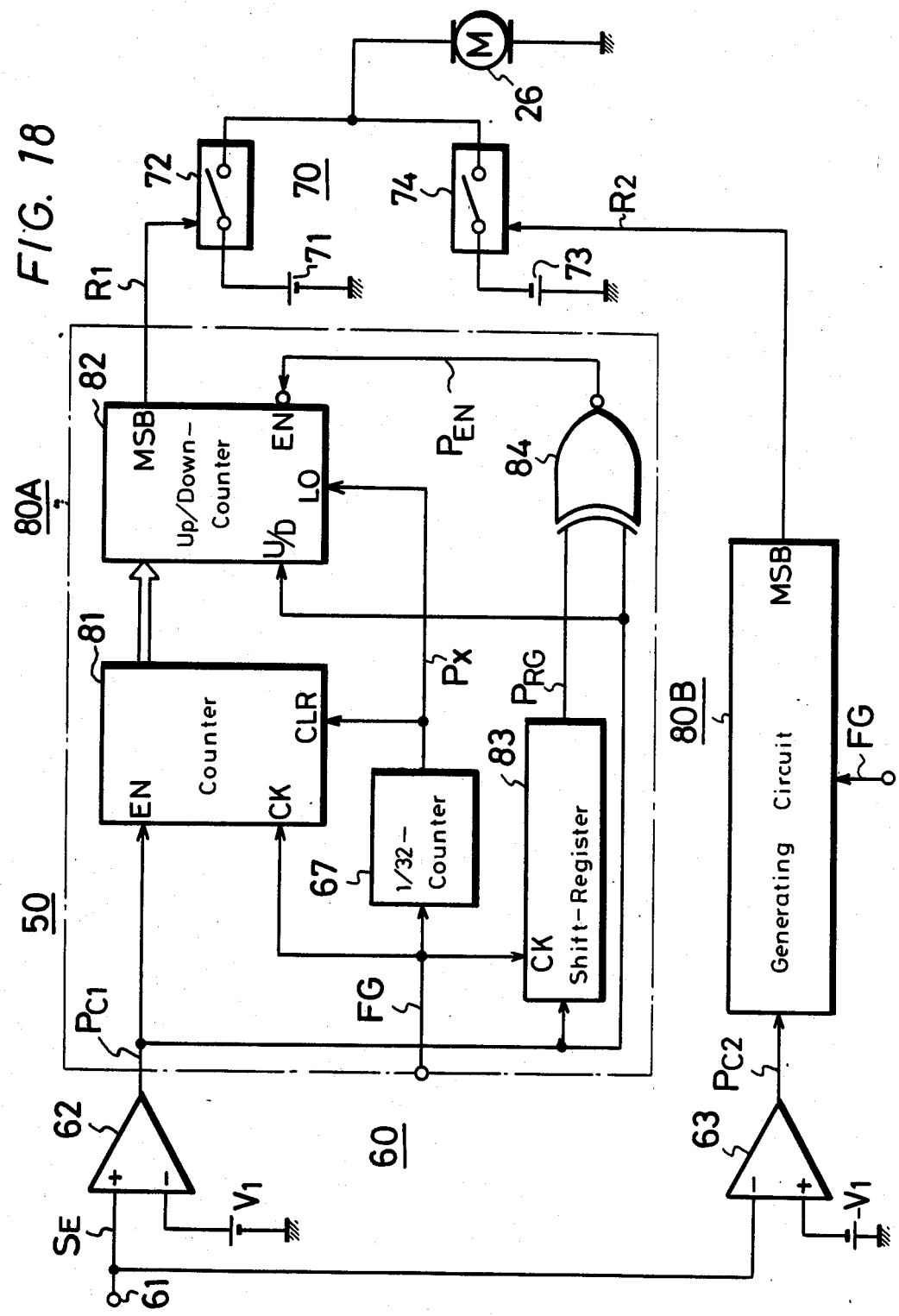
FIG. 18 is a systematic block diagram showing another embodiment of the skew error detecting circuit according to this invention.

FIG. 18 is a systematic block diagram showing a main part of the above skew error detecting circuit according to this invention. In this embodiment, in order to obtain the comparison pulses PC1 and PC2 that correspond to the DC skew error, there are also provided the first and second voltage comparators 62 and 63.

In FIG. 18, reference numeral 80A generally designates a first control signal generating circuit to which the first comparison pulse PC1 from the first voltage comparator 62 is supplied. The first control signal generating circuit 80A includes a counter 81, and the first comparison pulse PC1 is supplied to the counter 81 as its enable pulse, which then counts the pulse FG as the reference clock. The count data of the counter 81 is loaded to a up-down counter 82 at every one rotation cycle of the disc so that the pulse Px that results from frequency-dividing the pulse FG by 32 by a frequency divider 67 is supplied to the up-down counter 82 as its load pulse.

The first comparison pulse PC1 is also supplied to a shift register 83 of 32 bits (corresponding to the number of the pulse FG in one cycle), in which the data of the first comparison pulse PC1 is latched at timing of the pulse FG. For instance, as shown in FIG. 19A, since during one cycle between a and b, in the former half period W the pulse PC1 is at level "H" and in the remaining period the pulse PC1 is at level "L", during the period "H", the digital data of "1" is latched in the shift register 83, while during the period "L" the digital data "0" is latched therein. Thus, immediately before the sampling timing b, all the data of one cycle before the timing b are latched in the shift register 83. The output data $P_{RG}$ of the shift register 83 is delivered at the timing at which the pulse FG is produced.

The first comparison pulse PC1 is also supplied to the up-down counter 82 as its up-down control pulse. In this embodiment, the up-down counter 82 is controlled such that during the period "H", the up-down counter 82 is in the up-count mode, while during the period "L", the up-down counter 82 is in the down-count mode.

The up-down mode of the up-down counter 82 is executed only when the enable pulse is supplied to the up-down counter 82. To this end, the first comparison pulse PC1 and the output data $P_{RG}$ from the shift register 83 which is the data before just one cycle are supplied to an exclusive-NOR circuit (control circuit) 84 an output $P_{EN}$ of which is fed to the up-down counter 82 as its enable pulse.

The operation of the first control pulse generating circuit 80A will be described with reference to FIGS. 20A to 20C and FIG. 21.

Now, let it be assumed that as a result of the skew servo operation, the D.C. skew error VD decreases as shown in FIG. 20A, the D.C. skew error VD decreases to be lower more than the reference level V1 during the period between a and b and in this period or interval, W>T/2 is established. In this case, if the sampling point b is taken as a reference, the data of the counter 81 is loaded to the up-down counter 82 at the timing b.

The count data to be loaded becomes just "16" that is made equivalent to the analog data when W=T/2 is established. Thus, because W>T/2 is established, the count data at that time is larger than "16". For convenience of explanation, let it be assumed that the count data "19" be loaded to the up-down counter 82.

Then, since the output data $P_{RG}$ is delivered from the shift register 83 in synchronism with the input timing of the pulse FG, the exclusive-NOR circuit 84 carries out the comparison of the input levels in synchronism with the input timing of the pulse FG.

As shown in FIG. 20A, if the input timings of the pulse FG after the sampling point b are respectively taken as $b_1, b_2, \ldots$, at input timing $b_1$, the output data $P_{RG}$ with the same input timing $a_1$ as that of the one cycle before is obtained so that a relation between the data at each input timing of the first comparison pulse PC1 and the output data $P_{RG}$ becomes as shown in FIG. 21. As a result, at input timings $b_1, b_2, \ldots$, the enable pulses $P_{EN}$ become each "L" and the first comparison pulse PC1 at this time is "L" so that the up-down counter 82 is placed in the down-count mode. Thus, the count data that is loaded to the counter 82 is made down and at the input timing $b_3$, the count data is made down to "16".

Consequently, the MSB data of the counter 82 is changed from "H" to "L" at the timing of the input timing $b_3$ and hence the switching pulse R1 used as the motor control signal is changed from "H" to "L" in level, thus the motor 26 being stopped to rotate (FIG. 20C). When the motor 26 is stopped, the D.C. skew error VD becomes constant hereinafter (FIG. 20A).

As described above, when the data of one cycle before and the current data are compared with each other and when the count data is larger than "16", if the count data that is loaded to the counter 82 is decreased, the count data thus loaded to the counter 82 becomes less than "16" without failure prior to the succeeding sampling timing c. As a result, the skew servo can be made off at timing faster than that of the prior art with the result that even when the inherent sampling cycle is longer than that of the present one, the skew servo can be carried out without causing the servo system to be oscillated.

When the count data "32" at the sampling point a is loaded to the counter 82, the data of the first comparison pulse PC1 at respective input timings $a_1, a_2, \ldots$ after the sampling point a become "H" during the period W. Thus, it is not caused that the enable pulse $P_{EN}$ becomes "H" and the counter 82 is placed in the down-count mode. After the period W elapses, the data of the first comparison pulse PC1 is changed to "L" in level so that the counter 82 is placed in the down-count mode. In this case, however, since the remaining period is shorter than T/2, the count data loaded to the counter 82 can not become below "16" so that the motor 26 is maintained in the state to rotate in the positive direction.

The generating circuit 80B which produces a control signal R2 that is used to rotate the motor 26 in the opposite direction is formed similarly to the first generating circuit 80A and will not be described.

As described above, according to the second embodiment of the skew error detecting circuit according to this invention, since the data of one cycle before and the current data are compared with each other so as to control the data that is loaded to the up-down counter, the sampling period becomes short apparently so that if this skew error detecting circuit is used to detect the skew error of the disc that is rotated at low speed, the skew servo system is prevented from being oscillated. Thus, the stable skew servo can always be realized.

Further, since it is possible to detect at instant that the D.C. skew error VD is converged within the threshold levels ±V1, even if the absolute value of the threshold levels ±V1 is made small in order to raise the accuracy of the skew servo, the skew servo system is prevented from being oscillated. Thus, it is possible to realize the skew servo with high precision.

According to the skew error detecting circuit of the second example, since the skew error within the threshold levels ±V1 is a dead zone for the skew error detecting circuit, the motor 26 can be protected from the overload and the life of the motor 26 can be lengthened. In addition, since the AC skew error signal Sq of 30 Hz is digitally filtered, the response characteristic of the circuit can be improved.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. An optical information reproducing apparatus for reproducing information recorded on a recording surface on a disc shaped rotating record medium comprising:

an optical pick-up device having an optical axis and being mounted on a tiltable optical block, said pick-up device having a laser beam source for generating a laser beam directed towards said recording surface along said optical axis and a photo detector for detecting said beam reflected from said recording surface and for reproducing the recorded information;

means for rotating said record medium;

skew error detector means for detecting a tilt of the record medium at a skew angle relative to said optical pick-up device and for generating a skew error signal having a D.C. component and an A.C. component;

control circuit means supplied with the skew error signal for generating a control signal responsive to the D.C. component of said skew error signal; and skew error corrector means controlled by the control signal for controlling a position of said optical block so that the optical axis of said pick-up device is maintained perpendicular to the recording surface, wherein said control circuit means includes comparator means for comparing a level of said skew error signal with a threshold level and for generating an output pulse, a width of which corresponds to the D.C. component of the skew error signal, and pulse width discriminator means for detecting the width of said output pulse relative to a reference pulse corresponding to a rotational period of said record medium.

2. An optical information reproducing apparatus according to claim 1, wherein said comparator means includes first and second level comparing circuits for comparing the level of said skew error signal with upper and lower threshold levels and for generating upper and lower output pulses, respectively, and said pulse width discriminator means detects the widths of said upper and lower output pulses and generates the control signal for said skew error corrector means in response thereto.

3. An optical information reproducing apparatus according to claim 1, wherein said pulse width discriminator means includes counter means producing an output having a most significant bit, said output pulse being supplied to said counter means as a count enable pulse, and said rotating means generates an FG pulse indicative of rotation of said record medium, said FG pulse being applied to said counter means as a count pulse, and latch means for latching said most significant bit of the output of said counter means.

4. An optical information reproducing apparatus according to claim 3, wherein said skew error corrector means includes a motor for rotating said optical block, means for providing a uni-directional and constant control signal and switch means, an output of said latch means being supplied to said switch means to selectively supply said uni-directional control signal to said motor.

5. An optical information reproducing apparatus according to claim 3, wherein said counter means is cleared at every rotational period of said record medium.

6. An optical information reproducing apparatus according to claim 1, wherein said pulse width discriminator means includes first counter means, said output pulse being applied to said first counter means as a count enable pulse and an FG pulse of said rotating means indicative of rotation of said record medium being applied to said counter means as a count pulse, second counter means, an output of said first counter means being loaded to said second counter means at every rotational period of said record medium, delay means for delaying said output pulse for one rotational period of said record medium, and a comparator for comparing the input and output of said delay means and for controlling said second counter means in response thereto.

7. An optical information reproducing apparatus according to claim 6, wherein a most significant bit of the output of said second counter means is supplied to said skew error corrector means as a control signal.

8. An optical information reproducing apparatus according to claim 7, wherein said delay means includes shift register means, and said FG pulse is supplied to said shift register means as a clock pulse.

9. An optical information reproducing apparatus according to claim 8, wherein said comparator includes an exclusive OR gate, the input and output of said shift register means being supplied to respective inputs of said gate, and the output of said exclusive OR gate is supplied to said second counter means to which said FG pulse is supplied as a count pulse.

10. An optical information reproducing apparatus according to claim 9, wherein said second counter means is an up/down counter and said output pulse is supplied to said second counter means as a control signal for controlling the count direction thereof.

* * * * *